United States Patent [19]

Becker

[11] 3,963,828

[45] June 15, 1976

[54] MANUFACTURE OF URANIUM DIOXIDE POWDER

[75] Inventor: Manfred Becker, Eichenhain, Germany

[73] Assignee: Siemens Aktiengesellschaft, Munich, Germany

[22] Filed: Sept. 6, 1973

[21] Appl. No.: 394,861

[52] U.S. Cl................................ 423/261; 423/255; 423/256; 423/258; 252/301.1 R
[51] Int. Cl.² ........................................ C01G 43/02
[58] Field of Search ........... 423/255, 256, 261, 258; 252/301.1 R

[56] References Cited
UNITED STATES PATENTS 3,842,155    10/1974    Muller et al. ................... 423/261 X Primary Examiner—Stephen J. Lechert, Jr.
Attorney, Agent, or Firm—Kenyon & Kenyon Reilly Carr & Chapin

[57] ABSTRACT

Uranium dioxide powder is prepared by the AUC (ammonium uranyl carbonate) method. Supplementing the known process steps, the AUC, after separation from the mother liquor, is washed with an ammonium hydrogen cabonate or an $NH_4$ OH solution and is subsequently post-treated with a liquid which reduces the surface tension of the residual water in an AUC. Such a liquid is, for instance, alcohol.

3 Claims, No Drawings

MANUFACTURE OF URANIUM DIOXIDE POWDER

BACKGROUND OF THE INVENTION

The present invention concerns the manufacture of uranium dioxide powder by the ammonium uranyl carbonate method, also called the AUC method, in which $UF_6$ is first transformed into the gaseous phase and the latter is hydrolyzed in a water receiver with the simultaneous addition of $NH_3$ and $CO_2$; the AUC precipitated thereby is separated from the mother liquor by filtering and washing, and the $UO_2$ is formed by decomposition and reduction of the AUC at 500°C in a water vapor/hydrogen atmosphere. The uranium dioxide powder prepared in this manner is put into pellet form, for instance, by pressing and sintering and is enclosed as nuclear fuel in the fuel cladding tubes of nuclear reactor fuel elements. This manufacture of uranium dioxide is described in detail in German Pat. Nos. 1,126,363; 1,592,477 and 1,924,594.

The thermal decomposition of the AUC and the reduction of the hexavalent oxide into $UO_2$ in hydrogen gas is normally carried out in a furnace or in two separate furnace units, such as so-called vortex-bed furnaces.

The thermal decomposition of the AUC is an endothermic process step which, together with the adhering moisture, limits the capacity of any furnace, as a substantial part of the heat that is to be supplied by the furnace to the powder is first required to evaporate the residual water. In order to increase the throughput of these vortex-bed furnaces, it would, therefore, be desirable to reduce the moisture content of the AUC as much as possible.

SUMMARY OF THE INVENTION

According to the invention, the above objective is reached by washing the AUC, after separation from the mother liquor, with an ammonium hydrogen carbonate or an $NH_4OH$ solution and then post-treating it with a liquid which reduces the surface tension of the residual water in the AUC.

With the former process technique, the AUC filter cake had a residual water content of about 7 to 10 percent after washing and a subsequent 1 hour drying period, using the suction-drying principle. A further extension of the drying period resulted in no appreciable reduction of the water content. The method according to the present invention now makes a reduction of the water content to 0.5 to 0.8 percent possible. For this purpose, the filter cake is washed several times with a liquid, which is water-soluble and reduces the surface tension. A suitable liquid is alcohol, and preferably methyl alcohol. It is easy to understand that drying according to this treatment is relatively simple and that the evaporation of the residual alcohol in the vortex-bed furnace requires substantially less thermal energy than the water-moist AUC used heretofore. Surprisingly, it has been found that washing with alcohol leads to a further lowering of the fluorine content by displacement of the mother liquor already in the AUC, so that the pyrohydrolysis time required for the reduction of the fluorine content in carrying out the AUC process can be reduced, or that, with the pyrohydrolysis time being kept the same, the fluorine content in the $UO_2$ powder becomes smaller. Such a reduction of the fluorine content, however, is particularly important, as the useful life of the fuel rods in a nuclear reactor depends to a very large extent on the fluorine content of the nuclear fuel manufactured from this powder.

DETAILED DESCRIPTION OF THE INVENTION

To explain the present invention further, the manufacturing process of uranium oxide powder according to this invention, is disclosed in more detail as follows:

The suspension containing the AUC precipitate is placed on a rotary vacuum filter. The motor liquor, approximately 1 m³, is suctioned off for about one hour, whereupon the filter cake of approximately 500 kg weight, with about 0.3 to 0.4% by weight of fluorine, is washed three times with 50 liters each of a 1-molar ammonium hydrogen carbonate solution or an $NH_4OH$ solution. Then drying suction is again applied for one hour. After this, the filter cake contains still about 7 to 10% of water, and its fluorine content, referred to the uranium, is approximately 300 ppm. Now the cake is washed twice with 35 liters each of methyl alcohol (methanol), where a reaction time of about 20 minutes is interposed before suctioning off, so that the ammonium hydrogen carbonate solution or the $NH_4OH$ solution can be taken up by the methyl alcohol. Drying-suction is then applied again, for which about one-half hour is sufficient. The residual content of water, methanol and fluorine have thereby been reduced very substantially, as may be seen from the following Table, in which the depletion of the water and fluorine content in the AUC filter cake is shown in ten tests before and after washing with methanol.

Depletion of the Water and Fluorine Content in the AUC Filter Cake by Washing with Methanol

| Test No. | Before Washing with Methanol | | | After Washing with Methanol | | |
|---|---|---|---|---|---|---|
| | ppm F ref.to U | $H_2O$ % | $CH_3(OH)$ % | ppm F ref.to U | $H_2O$ % | $CH_3(OH)$ % |
| 1 | 180 | 8.5 | — | 100 | 0.2 | 3.0 |
| 2 | 140 | 12.5 | — | 130 | 0.2 | 2.5 |
| 3 | 275 | 7.5 | — | 115 | 0.2 | 2.8 |
| 4 | 115 | 10.0 | — | 100 | 0.2 | 2.0 |
| 5 | 130 | 9.0 | — | 130 | 0.2 | 3.0 |
| 6 | 180 | 10.0 | — | 150 | 0.5 | 3.1 |
| 7 | 400 | 7.0 | — | 300 | 0.2 | 2.2 |
| 8 | 250 | 7.0 | — | 170 | 0.5 | 2.7 |
| 9 | 240 | 8.0 | — | 220 | 0.4 | 3.2 |
| 10 | 215 | 10.0 | — | 135 | 1.2 | 2.8 |

From this will be seen that the throughput in the vortex-bed furnaces, in which the $UO_2$ is formed, is substantially greater with the pretreatment of this invention. If the production rate of $UO_2$ without washing the AUC with methanol is about 40 kg per hour, it can be increased for the same furnace to 60 to 80 kg per hour when this invention is applied.

In conclusion, it should be pointed out once more that in addition to this quite substantial increase in production capacity, an exceedingly advantageous reduction of the residual fluorine content is achieved.

What is claimed is:

1. Manufacture of $UO_2$ powder in which $UF_6$ is transformed into gaseous phase, the latter is hydrolized in water with the simultaneous addition of $NH_3$ and $CO_2$ to precipitate ammonium uranyl carbonate which is separated from the mother liquor by filtering and washing and the $UO_2$ is formed by decomposition and reduction of the separated ammonium uranyl carbonate by heating in a water vapor/hydrogen atmosphere;

wherein the improvement comprises, after separation from the mother liquor, washing the ammonium uranyl carbonate with a solution selected from the class consisting of an ammonium hydrogen carbonate solution and $NH_4OH$ solution, and thereafter washing the ammonium uranyl carbonate with an alcohol which reduces the surface tension of its residual water.

2. The method of claim 1 in which the washings are done during the filtering.

3. The method of claim 1 in which after said washings the ammonium uranyl carbonate is dried prior to further processing into $UO_2$, without supplying heat.

* * * * *